United States Patent
Egami et al.

(10) Patent No.: US 10,301,183 B2
(45) Date of Patent: May 28, 2019

(54) SILICA PARTICLE DISPERSION AND PRODUCTION METHOD OF THE SAME

(71) Applicant: JGC CATALYSTS AND CHEMICALS LTD., Kanagawa (JP)

(72) Inventors: Miki Egami, Fukuoka (JP); Mitsuaki Kumazawa, Fukuoka (JP); Hirotada Arakane, Fukuoka (JP); Ryo Muraguchi, Fukuoka (JP); Toshiharu Hirai, Kanagawa (JP)

(73) Assignee: JGC CATALYSTS AND CHEMICALS LTD., Kanagawa (JP)

( * ) Notice: Subject to any disclaimer, the term of this patent is extended or adjusted under 35 U.S.C. 154(b) by 0 days.

(21) Appl. No.: 15/855,092

(22) Filed: Dec. 27, 2017

(65) Prior Publication Data
US 2018/0179076 A1 Jun. 28, 2018

(30) Foreign Application Priority Data
Dec. 28, 2016 (JP) ................. 2016-256394

(51) Int. Cl.
| | |
|---|---|
| B24D 3/00 | (2006.01) |
| C09K 3/14 | (2006.01) |
| C01B 33/18 | (2006.01) |
| C09G 1/02 | (2006.01) |
| B24D 3/02 | (2006.01) |
| B24D 11/00 | (2006.01) |
| B24D 18/00 | (2006.01) |

(52) U.S. Cl.
CPC ........... *C01B 33/18* (2013.01); *C09G 1/02* (2013.01); *C09K 3/1409* (2013.01); *C01P 2004/62* (2013.01); *C01P 2004/64* (2013.01)

(58) Field of Classification Search
USPC .......................... 51/308, 293, 307
See application file for complete search history.

(56) References Cited

U.S. PATENT DOCUMENTS

2010/0071272 A1* 3/2010 Higuchi ............. C01B 33/141
51/308
2011/0209413 A1† 9/2011 Nishida

FOREIGN PATENT DOCUMENTS

| JP | H01-234319 | † 9/1989 |
|---|---|---|
| JP | H07-277752 | † 10/1995 |
| JP | H11-214338 | † 8/1999 |

(Continued)

*Primary Examiner* — James E McDonough
(74) *Attorney, Agent, or Firm* — Greenblum & Bernstein, P.L.C.

(57) ABSTRACT

Producing a silica particle by inhibiting the generation of incompletely reacted materials such as oligomers which have not been grown to the silica particles having the intended particle size. A dispersion liquid of a silica particle is produced by simultaneously adding, to a liquid substantially consisting of an organic solvent, a liquid containing silane alkoxide and a liquid containing an alkali catalyst and water to cause hydrolysis and polycondensations to produce a silica particle. The variation rate of the mole ratio of the alkali catalyst to silane alkoxide in the reaction system for a period from the start to the end of the reaction relative to the initial mole ratio is 0.90 to 1.10; and the variation rate of the mole ratio of water to silane alkoxide for a period from the start to the end of the reaction relative to the initial mole ratio is 0.90 to 1.10.

4 Claims, 5 Drawing Sheets

(56) References Cited

FOREIGN PATENT DOCUMENTS

| | | | |
|---|---|---|---|
| JP | 2001-253708 | † | 9/2001 |
| JP | 2005-060217 | † | 3/2005 |
| JP | 2005-263729 | † | 9/2005 |
| JP | 4566645 B2 | * | 10/2010 |
| JP | 4566645 B2 | | 10/2010 |
| JP | 2012-156393 A | | 8/2012 |
| JP | 2014-154707 A | | 8/2014 |
| JP | 2015-124231 A | | 7/2015 |
| WO | 2013/085574 | † | 6/2013 |

\* cited by examiner
† cited by third party

SILICA PARTICLE DISPERSION AND PRODUCTION METHOD OF THE SAME

BACKGROUND OF THE INVENTION

Field of the Invention

The present invention relates to a method for producing a dispersion liquid of a silica particle, and particularly to a method for producing a dispersion liquid of a silica particle useful for an abrasive used in polishing during formation of a metal wiring layer on a semiconductor integrated circuit, etc.

Description of the Related Art

Various integrated circuits are used for computers and various electronic devices. As they are downsized and become sophisticated, higher density and higher performance have been required for circuits.

To produce a semiconductor integrated circuit, for example, an interlayer film (insulating film) is formed on a substrate such as a silicon wafer, a groove pattern for a metal wiring is formed on the interlayer film (insulating film), a barrier metal layer of tantalum nitride (TaN) or the like is formed by a sputtering method or the like, as necessary, and then a copper film for a metal wiring is formed by a chemical vapor deposition (CVD) method or the like. Here, when a barrier metal layer of TaN or the like is provided, the barrier metal layer can prevent, for example, lowering of the insulation properties of the interlayer insulating film in association with the diffusion of copper or an impurity or the like to the interlayer insulating film and erosion of the interlayer insulating film, and can enhance the adhesion between the interlayer insulating film and copper.

Subsequently, a film of unnecessary copper and barrier metal (occasionally referred to as "sacrifice layer") formed on a portion out of the groove is removed by polishing with a chemical-mechanical polishing (CMP) method and the upper surface is flattened to the maximum extent possible, and thus a wiring/circuit pattern of copper is formed by leaving a metal film only in the groove.

The abrasive used in the CMP method is typically produced by adding an oxidant for increasing the polishing rate of a wiring/circuit metal and an additive such as organic acid to a dispersion liquid comprising a spherical polishing particle consisting of a metal oxide such as silica and having an average particle diameter of about 5 to 300 nm.

When incompletely reacted materials (by-products) such as oligomers of silane alkoxide are present in the dispersion liquid comprising the polishing particle (silica sol), the silica sol has not had a sufficient stability, presumably due to the influence of the incompletely reacted materials such as highly reactive oligomers. Further, thickening, aggregation, white turbidity, generation of a sedimentary gel, etc. sometimes have occurred due to the influence of additives mixed to the dispersion liquid when used as an abrasive. Use of such an abrasive sometimes has resulted in appearance of scratches due to aggregates and has caused a problem by silica components remaining on a substrate after polishing (e.g., see Japanese Patent Laid-Open Publication Nos. 2015-124231, 2012-156393, and 2014-154707). Furthermore, in some cases, the silica sol has adsorbed an additive for enhancing the abrasive property, resulting in reduction in the effect of the additive.

As a method for producing a silica sol in which the generation of incompletely reacted materials such as such oligomers is suppressed, for example, proposed is a method which comprises (a) a step of adding an organic solvent containing tetramethoxysilane and a solvent containing an alkali catalyst and water to an organic solvent containing an alkali catalyst and water to cause hydrolysis and polycondensation of tetramethoxysilane, so as to produce a silica sol; and (b) a step of heating a dispersion medium of the silica sol to a boiling point of water to substitute with water (see Japanese Patent No. 4566645).

PRIOR ART DOCUMENTS

1. Japanese Patent Laid-Open No. 2015-124231, paragraphs [0002] and [0006]
2. Japanese Patent Laid-Open No. 2012-156393, paragraph [0007]
3. Japanese Patent Laid-Open No. 2014-154707, paragraph [0007]
4. Japanese Patent No. 4566645

The method described in Japanese Patent Laid-Open No. 2015-124231 produces a highly-pure silica particle in a good productivity but, in step (a), generates incompletely reacted materials such as oligomers of silane alkoxide which do not grow to the silica particles which are intended to be produced thus requires step (b) for removing the incompletely reacted materials. Therefore, this method has a problem from the standpoint of production efficiency, cost, etc.

The present invention has been made in view of the above circumstances. An object of the present invention is to provide a method for producing a dispersion liquid of a silica particle in which the silica particle is efficiently produced, by suppressing the generation of incompletely reacted materials such as oligomers which do not grow to silica particles which are intended to be produced.

SUMMARY OF THE INVENTION

As a result of diligent research to solve the above-described problems, the present inventors have found that the generation of incompletely reacted materials such as oligomers which do not grow to silica particles which are intended to be produced is suppressed by simultaneously adding a liquid A containing silane alkoxide and a liquid B containing an alkali catalyst and water to a liquid I consisting substantially of an organic solvent in a container, and have completed the present invention. Particularly, they have found that by keeping the amounts of water and alkali catalyst which have a great influence on the hydrolysis of silane alkoxide to be constant relative to the amount of the silane alkoxide during the reaction period, the silane alkoxide which is sequentially added can always hydrolyze under the same conditions, and the generation of incompletely reacted materials such as oligomers which do not grow to silica particles which are intended to be produced is thus suppressed.

Accordingly, the present invention relates to a method for producing a dispersion liquid of a silica particle, comprising a step of providing a liquid I consisting substantially of an organic solvent in a reaction container; and a step of simultaneously adding a liquid A containing silane alkoxide and a liquid B containing an alkali catalyst and water to the liquid I, to cause hydrolysis and polycondensation of the silane alkoxide, so as to produce a silica particle.

The method is preferably a method for producing a dispersion liquid of a silica particle that satisfies the following provisions (1) and (2):

(1) the variation rate of the mole ratio of the alkali catalyst to silane alkoxide (alkali catalyst/silane alkoxide) in the reaction system during a period from a start to an end of an addition of the liquids A and B (a period from the start of the reaction (start of the addition) to the end of the reaction) relative to the initial mole ratio of the alkali catalyst to silane alkoxide is 0.90 to 1.10; and (2) the variation rate of the mole ratio of water to silane alkoxide (water/silane alkoxide) in the reaction system during the period from the start to the end of the addition of the liquids A and B (a period from the start of the reaction (the addition) to the end of the reaction) relative to the initial mole ratio of water to silane alkoxide is 0.90 to 1.10.

Hereinafter in the present specification, the expression "variation rate of the mole ratio of the alkali catalyst to silane alkoxide in the reaction system during a period from the start to the end of the addition of the liquids A and B relative to the initial mole ratio" is simply referred to as "variation rate of catalyst proportion," and the expression "variation rate of the mole ratio of water to silane alkoxide in the reaction system during a period from the start to the end of the addition of the liquids A and B relative to the initial mole ratio" is simply referred to as "variation rate of water proportion." The expression "period from the start to the end of the addition of the liquids A and B" is referred to as "period from the start to the end of the reaction."

It is preferred that, in the production method according to the present invention, the mole ratio of the alkali catalyst to silane alkoxide in the reaction system during a period from the start to the end of the reaction is constantly 0.20 or more, and the mole ratio of water to silane alkoxide in the reaction system during a period from the start to the end of the reaction is constantly 2.0 or more. Further, the pH in the reaction system at the end of the reaction is preferably 11 or higher.

The present invention also relates to a dispersion liquid of a silica particle comprising a silica particle having an average particle diameter (d) of 5 to 300 nm, wherein a content of incompletely reacted materials in the dispersion liquid is 200 ppm or less.

It is preferred that, in the dispersion liquid of a silica particle according to the present invention, the silica particle includes a content of each of U and Th of less than 0.3 ppb, a content of each of alkali metals, alkali earth metals, Fe, Ti, Zn, Pd, Ag, Mn, Co, Mo, Sn, Al, and Zr of less than 0.1 ppm, and a content of each of Cu, Ni, and Cr of less than 1 ppb.

According to the method for producing a dispersion liquid of a silica particle of the present invention, the silica particle can be efficiently produced by suppressing the generation of incompletely reacted materials such as oligomers which do not grow to silica particles which are intended to be produced.

DETAILED DESCRIPTION OF THE PREFERRED EMBODIMENTS

[Method for Producing Dispersion Liquid of Silica Particle]

The method for producing a dispersion liquid of a silica particle according to the present invention is a method for producing a silica particle by simultaneously adding a liquid A containing silane alkoxide and a liquid B containing an alkali catalyst and water to a liquid I consisting substantially of an organic solvent to cause hydrolysis and polycondensation of the silane alkoxide. It is preferred that, in the method for producing a dispersion liquid of a silica particle according to the present invention, the variation rate of the mole ratio of the alkali catalyst to silane alkoxide in the reaction system during a period from the start to the end of the reaction relative to the initial mole ratio is 0.90 to 1.10; and the variation rate of the mole ratio of water to silane alkoxide in the reaction system during a period from the start to the end of the reaction relative to the initial mole ratio is 0.90 to 1.10.

In the method for producing a dispersion liquid of a silica particle, a liquid A containing silane alkoxide and a liquid B containing an alkali catalyst and water are simultaneously added to a liquid I consisting substantially of an organic solvent to keep constant the amounts of water and an alkali catalyst relative to the amount of the silane alkoxide during the reaction period from the start to the end of the reaction, so that the silane alkoxide which is sequentially added is always hydrolyzed under the same conditions. As such, the generation of incompletely reacted materials such as oligomers which do not grow to silica particles which are intended to be produced is thus suppressed. This makes it possible to eliminate a step of removing incompletely reacted materials and thus to efficiently produce a dispersion liquid of a silica particle. As the produced dispersion liquid of a silica particle does not contain incompletely reacted materials such as oligomers, it can thus provide an abrasive having an excellent stability as a dispersion liquid of a silica particle and an abrasive, and having a good abrasive property.

<Liquid I (Liquid Provided in Advance in Container)>

A liquid I consists substantially of an organic solvent. Examples of the organic solvent include an alcohol, a ketone, an ether, a glycol, and an ester, with an alcohol being preferred. More particularly, alcohols such as methanol, ethanol, propanol, and butanol; ketones such as methyl ethyl ketone and methyl isobutyl ketone; glycol ethers such as methyl cellosolve, ethyl cellosolve, and propylene glycol monopropyl ether; glycols such as ethylene glycol, propylene glycol, and hexylene glycol; and esters such as methyl acetate, ethyl acetate, methyl lactate, and ethyl lactate can be exemplified. Among them, methanol or ethanol is more preferred, and methanol is particularly preferred. These organic solvents may be used alone or in a mixture of two or more.

The expression "consist(ing) substantially of an organic solvent" used herein means that the inevitably contained impurities or the like derived from the process of producing the organic solvent can be contained but the other impurities or the like are not contained. For example, the content of the organic solvent is 99% by mass or more, and preferably 99.5% by mass or more.

In a conventional reaction system in which an alkali catalyst and water are placed in a liquid I, the composition in the system changes sequentially from the start of the reaction, and the hydrolysis conditions of the silane alkoxide are not constant. Further, the pH in the system is high at the start of the reaction but tends to decrease thereafter, and when the amount of alkali catalyst to be added is insufficient, the pH often becomes below 11 at the end of the reaction and incompletely reacted materials tend to generate. However, according to the present invention, a liquid I consisting substantially of an organic solvent is used and the generation of the incompletely reacted materials can thus be inhibited.

<Liquid A>

The liquid A contains silane alkoxide, and preferably further contains an organic solvent. Typically, it is substantially consisted of silane alkoxide, or substantially consisted of two components, i.e. silane alkoxide and an organic solvent. In a similar manner as described above, the expressions "substantially consist(ing) of silane alkoxide" and "substantially consist(ing) of two components" used herein mean that the inevitably contained impurities or the like derived from the process of generating the silane alkoxide or the organic solvent can be contained but other impurities or the like are not contained, and the content of the organic solvent or the content of silane alkoxide and the organic solvent is 99% by mass or more, and preferably 99.5% by mass or more.

Examples of the silane alkoxide include silane alkoxides represented by the following formula [1].

[1]

$$X_n Si(OR)_{4-n}$$  [1]

In the formula, X represents a hydrogen atom, a fluorine atom, an alkyl group having 1 to 8 carbon atoms, an aryl group, or a vinyl group; R represents a hydrogen atom, an alkyl group having 1 to 8 carbon atoms, an aryl group, or a vinyl group; and n is an integer of 0 to 3.

Examples of the silane alkoxide represented by the formula [1] other than tetramethoxysilane and tetraethoxysilane include tetraisopropoxysilane, tetrabutoxysilane, tetoraoctoxysilane, methyltrimethoxysilane, methyltriethoxysilane, methyltriisopropoxysilane, ethyltrimethoxysilane, ethyltriethoxysilane, ethyltriisopropoxysilane, octyltrimethoxysilane, octyltriethoxysilane, vinyltrimethoxysilane, vinyltriethoxysilane, phenyltrimethoxysilane, phenyltriethoxysilane, trimethoxysilane, triethoxysilane, triisopropoxysilane, fluorotrimethoxysilane, fluorotriethoxysilane, dimethyldimethoxysilane, dimethyldiethoxysilane, diethyldimethoxysilane, diethyldiethoxysilane, dimethoxysilane, diethoxysilane, difluorodimethoxysilane, difluorodiethoxysilane, trimethylmethoxysilane, trimethylethoxysilane, trimethylisopropoxysilane, trimethylbutoxysilane, trifluoromethyltrimethoxysilane, and trifluoromethyltriethoxysilane.

Among these, silane alkoxides represented by the formula [1] wherein n is 0 and the alkyl chain of R is short, such as tetramethoxysilane (TMOS) and tetraethoxysilane (TEOS), are particularly preferably used. This is because when these are used, the hydrolysis rate tends to be high and the incompletely reacted materials tend not to remain. Among them, tetramethoxysilane (TMOS) having a short alkyl chain is preferred.

The organic solvent to be used can be the organic solvents exemplified regarding the liquid I, but the organic solvent having the same composition as the liquid I is preferably used. That is, when methanol is used in the liquid I, methanol is also preferably used in the liquid A.

When the liquid A contains an organic solvent, the concentration of silane alkoxide relative to the organic solvent is, for example, 1.5 to 6.4 mol/L, and preferably 2.0 to 6.0 mol/L.

<Liquid B>

The liquid B contains an alkali catalyst and water, and usually consists substantially of two components. The expression "consist(ing) substantially of two components" used herein have the same meaning as described above regarding the liquid A.

Examples of the alkali catalyst to be used include basic compounds, such as ammonia, an amine, an alkali metal hydride, an alkali earth metal hydride, alkali metal hydroxide, an alkali earth metal hydroxide, a quaternary ammonium compound, and an amine-based coupling agent, with ammonia being preferred.

Here, the concentration of the alkali catalyst relative to water is, for example, 1 to 24 mol/L, and preferably 3 to 15 mol/L.

<Reaction Conditions, Etc.>

As described above, the method for producing a dispersion liquid of a silica particle according to the present invention is a method for producing a silica particle by simultaneously adding a liquid A containing silane alkoxide and a liquid B containing an alkali catalyst and water to a liquid I consisting substantially of an organic solvent to cause hydrolysis and polycondensation of the silane alkoxide, and preferably satisfies the following two provisions:

(1) the variation rate of the mole ratio of the alkali catalyst to silane alkoxide in the reaction system relative to the initial mole ratio during a period from the start to the end of the reaction (variation rate of catalyst proportion) is 0.90 to 1.10; and (2) the variation rate of the mole ratio of water to silane alkoxide in the reaction system relative to the initial mole ratio during a period from the start to the end of the reaction (variation rate of water proportion) is 0.90 to 1.10.

The production method according to the present invention is a method in which the variation rate of catalyst proportion and the variation rate of water proportion during a period from the start to the end of the reaction are intended to be reduced as much as possible and to keep the variation rates constant. The specific embodiments of the production method according to the present invention include a method for suppressing the variation rate of catalyst proportion and the variation rate of water proportion by keeping the amounts of the alkali catalyst and water contained in the liquid I as low as possible. The embodiments also include a method for suppressing the variation rate of catalyst proportion and the variation rate of water proportion by keeping the addition conditions such as addition rates of the liquid A and the liquid B as constant as possible during a period from the start to the end of the reaction. For example, the changes in the addition rates of the liquid A and the liquid B can be suppressed by using a highly accurate pump.

Each of "the mole ratio of an alkali catalyst to silane alkoxide (alkali catalyst/silane alkoxide)" and "the mole ratio of water to silane alkoxide (water/silane alkoxide)" as used herein refers to the mole ratio calculated based on the measured addition weights, assuming that the hydrolysis and polycondensation reactions of silane alkoxide take place instantaneously and the alkali catalyst is not released out of the system. Each of the variation rate of catalyst proportion and the variation rate of water proportion is determined at the predetermined time intervals (for example, every 10 minutes) from the numerical value obtained by calculating the mole ratio from the measured addition weights and dividing the calculated value by the initial mole ratio. The initial value (initial mole ratio) refers to the mole ratio (theoretical value) immediately after addition of the liquid A and the liquid B.

In the method for producing a dispersion liquid of a silica particle, the variation rate of catalyst proportion is preferably 0.90 to 1.10 as described above, more preferably 0.95 to 1.05, and still more preferably 0.98 to 1.02.

Also, in the method for producing a dispersion liquid of a silica particle, the variation rate of water proportion is preferably 0.90 to 1.10 as described above, more preferably 0.95 to 1.05, and still more preferably 0.98 to 1.02.

Further, it is preferred that, in the present invention, the mole ratio of the alkali catalyst to silane alkoxide in the reaction system during a period from the start to the end of the reaction is constantly 0.20 or more and the mole ratio of water to silane alkoxide in the reaction system for a period from the start to the end of the reaction is constantly 2.0 or more. That is, it is preferred that, during the reaction, each of the amounts of the alkali catalyst and water relative to the amount of silane alkoxide is kept at a predetermined value or more. By subjecting to the reaction the alkali catalyst and water the amounts of which are kept at the predetermined value or more relative to the amount of silane alkoxide, it is possible to allow hydrolysis to sufficiently proceed, and inhibit an unreacted silane alkoxide from remaining and incompletely reacted materials from generating.

Each of the mole ratio of the alkali catalyst to silane alkoxide and the mole ratio of water to silane alkoxide refers to the mole ratio calculated based on the measured addition weights as described above.

As described above, the mole ratio of the alkali catalyst to silane alkoxide in the reaction system during a period from the start to the end of the reaction is preferably constantly 0.20 or more, more preferably constantly 0.30 or more, and still more preferably constantly 0.50 to 1.00.

Also, as described above, the mole ratio of water to silane alkoxide in the reaction system during a period from the start to the end of the reaction is preferably constantly 2.0 or more, more preferably constantly 3.0 or more, and still more preferably constantly 3.5 to 15.0.

Further, the pH in the reaction system at the end of the reaction is preferably 11 or higher, and more preferably 11.2 or more. In a conventional reaction system in which an alkali catalyst is placed in a liquid I, the pH in the system is often below 11 at the end of the reaction, which is a cause of the generation of the incompletely reacted materials. However, in the production method according to the present invention, as described above, the pH at the end of the reaction can be 11 or higher by adding the alkali catalyst and water the amounts of which are kept constant relative to the amount of silane alkoxide.

In the production method according to the present invention, the reaction is usually performed under atmospheric pressure at a temperature equal to or lower than the boiling point of the solvent to be used, and preferably at a temperature lower by about 5 to 10° C. than the boiling point. After the reaction, water substitution (exchange of the solvent for water) is performed as necessary.

For a dispersion liquid of a silica particle produced by the production method according to the present invention, the generation of the incompletely reacted materials such as oligomers of silane alkoxide is suppressed, and therefore, it is not always necessary to perform heat-ripening treatment, heat removal treatment, and purification treatment such as ultrafiltration, which have been conventionally performed.

[Dispersion Liquid of Silica Particle]

The dispersion liquid of a silica particle according to the present invention comprises a silica particle having an average particle diameter (d) of 5 to 300 nm, wherein the dispersion liquid includes a content of incompletely reacted materials of 200 ppm or less. The dispersion liquid of a silica particle can be produced by the above-described production method according to the present invention. The dispersion liquid of a silica particle is useful as an abrasive, and may be used as it is or in a dried state.

The incompletely reacted materials refer to silicon-containing compounds for which the reaction has not proceeded to provide the silica particles intended to be produced, for example, unreacted raw material silane alkoxide and its hydrolyzates (oligomers) having a low molecular weight, specifically silicon-containing compounds present in a supernatant obtained when centrifuging an aqueous dispersion liquid of a silica particle at 10° C., 1,370,000 rpm (1,000,000 G) for 30 minutes with CS150GXL, a micro ultracentrifuge manufactured by Hitachi Koki Co., Ltd.

(Measurement Method of Content of Incompletely Reacted Materials)

The silicon-containing compounds (incompletely reacted materials) present in the above supernatant are subjected to ICP emission spectrometer ICPS-8100 manufactured by Shimadzu Corporation to measure the Si contents, and the comparison is performed with the $SiO_2$ concentrations calculated from the Si contents.

Since the dispersion liquid of a silica particle does not contain the incompletely reacted materials such as oligomers, when it is used as or in an abrasive, the deposits can be suppressed from generating on substrates, and the adsorption of and reaction with various chemicals added to the abrasives can be suppressed to exert effects of the chemicals more effectively.

The silica particles contained in the dispersion liquid of a silica particle form a three-dimensional polycondensation structure. This is due to the fact that hydrolysis and polycondensation of silane alkoxide occurring in an alkaline environment proceed not only in a planar state (in a two-dimensional manner) but also in a cubic manner (in a three-dimensional manner). An abrasive using a particle having such a structure is suitable because it has a high particle dispersibility and provides a sufficient polishing rate. On the other hand, hydrolysis and polycondensation of the silane alkoxide occurring in an acidic environment proceed in a two-dimensional manner, and hence a spherical particle cannot be obtained.

The structure can be determined by the presence of a particle observed with a transmission electron microscope or a scanning electron microscope.

Figure 1:
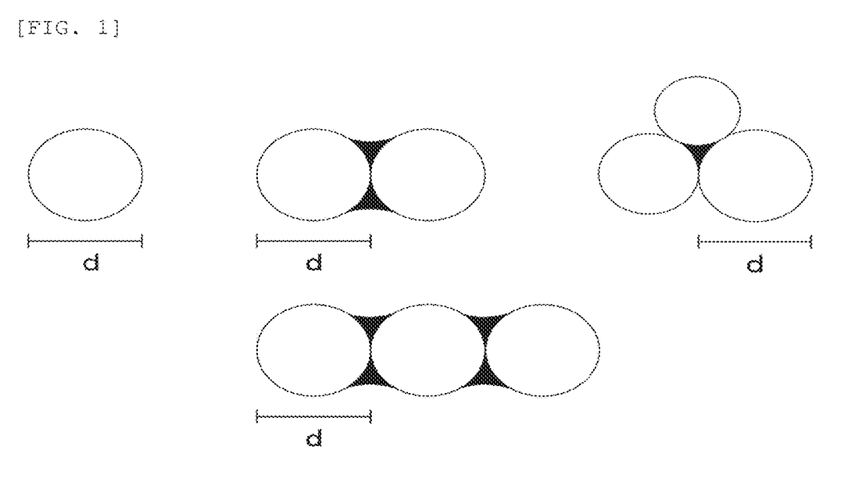
FIG. 1 shows diagrams illustrating a method for calculating the average particle diameter (d) in the present invention, wherein each solid black area represents an interparticle junction part, and each interparticle junction part may include a space.

The average particle diameter (d) of a silica particle contained in the dispersion liquid of a silica particle is 5 to 300 nm, and can be appropriately set in accordance with a required polishing rate, polishing precision, and so on. The method for calculating an average particle diameter (d) is described with reference to FIG. 1. FIG. 1 illustrates a particle in which a primary particle is present alone and a particle in which a plurality of primary particles are linked to each other, wherein each solid black area represents an interparticle junction part and each interparticle junction part may include a space. The particle diameter d is the longest diameter measured for the primary particle contained in each particle. The average particle diameter (d) is determined as follows: an electron micrograph of a silica particle is taken and 100 particles are arbitrarily selected therefrom; the longest diameter d of the primary particle is measured for each of the 100 particles; and the average value is used as the average particle diameter (d).

When the average particle diameter is smaller than 5 nm, the dispersion liquid of a silica particle tends to have insufficient stability, and the particle diameter is too small to achieve a sufficient polishing rate. When the average particle diameter is larger than 300 nm, scratches are likely to generate and insufficient smoothness is not obtained in some cases when the silica particle is used as an abrasive, although depending on the types of substrate or insulating film. The average particle diameter is preferably 10 to 200 nm, and more preferably 15 to 100 nm.

The silica particle contained in the dispersion liquid of a silica particle may be a true spherical-shaped particle having an aspect ratio of 1.00 to 1.20, but it is preferably an irregular-shaped particle having an aspect ratio of more than 1.20 and 5.00 or less. The irregular-shaped particle having an aspect ratio within the above range has a convex portion in its surface. As a result, stress is concentrated to the convex portion in polishing, resulting in a higher polishing rate in polishing the substrate.

Figure 2:
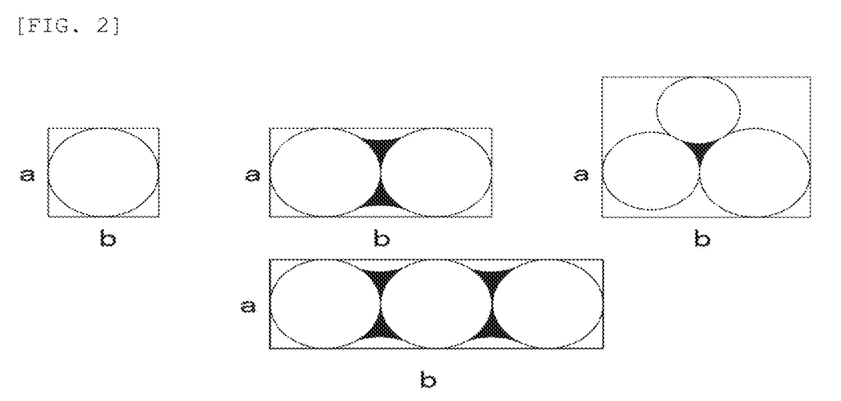
FIG. 2 shows diagrams illustrating a method for calculating the aspect ratio (b/a; provided that b a) in the present invention, wherein a represents a short axis diameter and b represents a long axis diameter, each solid black area represents an interparticle junction part, and each interparticle junction part may include a space.

The method for calculating an aspect ratio is described with reference to FIG. 2. FIG. 2 illustrates a particle in which a primary particle is present alone and a particle in which a plurality of primary particles are linked to each other, wherein each solid black area represents an interparticle junction part and each interparticle junction part may include a space. The aspect ratio is determined as follows: particles are observed under a scanning electron microscope; the long side of a rectangle enclosing a particle is defined as the side b and the short side is defined as the side a as illustrated in FIG. 2 and the vertical-to-horizontal ratio (b/a) is measured for each of 100 particles; and the average value is used as the aspect ratio.

It is preferred that, in the dispersion liquid of a silica particle, the silica particle includes a content of each of U and Th of less than 0.3 ppb, a content of each of alkali metals, alkali earth metals, Fe, Ti, Zn, Pd, Ag, Mn, Co, Mo, Sn, Al, and Zr of less than 0.1 ppm, and a content of each of Cu, Ni, and Cr of less than 1 ppb. By being within this range, the silica-based particle can be used as an abrasive grain for highly integrated logics and memories with a wiring node of 40 nm or less, and for three-dimensional implementation.

When the metal elements as impurity components are present in quantities larger than the above-mentioned ranges, the metal elements may remain on a substrate polished with the silica particle, and cause insulation failure to a circuit formed on a semiconductor substrate or short the circuit to decrease the dielectric constant of a film for insulation (insulating film) and increase the impedance of the metal wiring, leading to lowering of the response speed, increase of the power consumption, and so on. In addition, the metal element ions may migrate (diffuse), and the failures may be caused under some conditions for use or after a long-term use. In particular, U and Th generate radiation to cause malfunctions to a semiconductor device even when the amount of remaining U or Th is minute. Thus, the U or Th content higher than the above range is not preferred.

Here, the alkali metal refers to Li, Na, K, Rb, Cs, or Fr. The alkali earth metal refers to Be, Mg, Ca, Sr, Ba, or Ra.

To obtain such a highly-pure silica particle with a small content of impurity components, it is preferred to use an apparatus the material of which is free of such elements and has high chemical resistance in preparation of the particle. Specific preferred examples of the material include plastics such as Teflon®, FRP, and carbon fibers, and non-alkali glass.

In addition, it is preferred to purify raw materials to be used by distillation, ion exchange, or removal with a filter. In particular, alcohol used in hydrolysis of alkoxide, may be contaminated with metal impurity components from a tank and so on or with a catalyst during synthesis, and may require purification at a particularly high level.

As a method to obtain a highly-pure silica particle, it is possible to provide raw materials with a small content of impurity components in advance, or preventing contamination from an apparatus for particle preparation, as described above. As another method, it is possible to reduce impurity components for a particle prepared without taking such countermeasures sufficiently. However, as impurity components are incorporated in the silica particle, purification using ion exchange or removal with a filter would be inefficient, and high cost may be required. Thus, it is not practical for obtaining a silica particle with a small content of impurity components with such a method.

To determine the content of U and Th, the contents of alkali metals, alkali earth metals, Fe, Ti, Zn, Pd, Ag, Mn, Co, Mo, Sn, Al, and Zr, and the contents of Cu, Ni, and Cr in the silica particle, the silica particle is dissolved in hydrofluoric acid, and heated to remove the hydrofluoric acid and then added with pure water as necessary, and the resulting solution is subjected to measurement with an inductively coupled plasma (ICP) emission mass spectrometer (for example, ICPM-8500 manufactured by Shimadzu Corporation).

EXAMPLES

Hereinafter, the present invention will be described with reference to Examples. However, the present invention shall be not limited to these Examples.

Example 1

<Production of Dispersion Liquid of Silica Particle (SA)>

Figure 3:
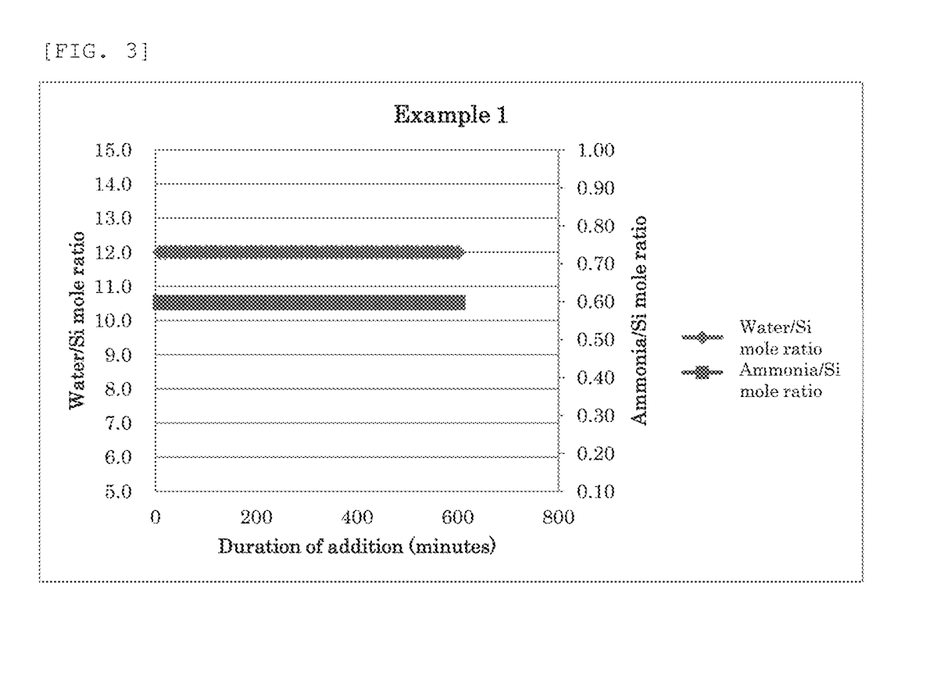
FIG. 3 is a graph showing the chronological change in the variation rate of catalyst proportion and the variation rate of water proportion in Example 1.

410.0 g of methanol (liquid I) was kept at 40° C., and 3436.3 g of a methanol solution of tetramethoxysilane (manufactured by Tama Chemicals Co., Ltd. (the same applies hereinafter) (liquid A) and 1684.0 g of aqueous ammonia (liquid B) were simultaneously added to the liquid I over 10 hours. After completion of the addition, the mixture was further aged at the same temperature for 3 hours. The solvent was substituted with pure water to obtain 20% by mass of a dispersion liquid of a silica particle (SA). Detailed processing conditions and results of various measurements are shown in Table 1. The chronological changes with time in the variation rate of catalyst proportion and the variation rate of water proportion are shown in FIG. 3.

<<Mole Ratios of Alkali Catalyst and Water to Silane Alkoxide, and Variation Rates of the Mole Ratio>>

Each of the mole ratios of alkali catalyst/silane alkoxide and water/silane alkoxide was calculated based on the measured addition weights, assuming that the hydrolysis and polycondensation reactions of silane alkoxide take place instantaneously and the alkali catalyst is not released out of the system. Each of mole ratios in the reaction system was calculated from 10 minutes after the start of the addition of the liquids A and B and every 10 minutes thereafter. The variations of the mole ratios of the substances in the reaction system were compared with each other by using the numerical values obtained by dividing the mole ratios by the mole ratios (theoretical values) immediately after the addition of the liquid A and the liquid B as the initial values.

(4 mol consumed during hydrolysis)

(2 mol released during polycondensation)

<<Measurement of Average Particle Diameter>>

The average particle diameter was determined as follows: an electron micrograph of a silica particle was taken and 100 particles were arbitrarily selected therefrom; the longest diameter of the primary particle was measured for each of the 100 particles as illustrated in FIG. 1; and the average value was used as the average particle diameter.

<<Measurement of Aspect Ratio>>

The aspect ratio was determined as follows: an electron micrograph of a silica particle was taken; the long side of a rectangle enclosing a particle was defined as the side (b) and the short side as the side (a) as illustrated in FIG. 2 and the vertical-to-horizontal ratio (b/a) was measured for each of 100 particles arbitrarily selected; and the average value was used as the aspect ratio.

<<Measurement of Amounts of Incompletely Reacted Materials>>

For the amounts of incompletely reacted materials, silicon-containing compounds (incompletely reacted materials) present in a supernatant obtained when centrifuging the above-obtained 20% by mass of dispersion liquid of a silica particle at 10° C., 1,370,000 rpm (1,000,000 G) for 30 minutes with CS150GXL micro ultracentrifuge manufactured by Hitachi Koki Co., Ltd. were subjected to ICP emission spectrometer ICPS-8100 manufactured by Shimadzu Corporation to measure the Si contents, and the comparison was performed with the $SiO_2$ concentrations calculated from the Si contents.

<<Measurement of Concentration of Silica Particle in Reaction System>>

5 g of each of samples was dried at 150° C. for 1 hour, and the concentration of the silica particle in the reaction system was calculated from the weight after drying.

<Production of Abrasive (SA)>

An abrasive (SA) containing 3.0% by mass of the silica particles produced in Example 1, 175 ppm of hydroxyethyl cellulose (HEC), and 225 ppm of ammonia was prepared.

<<Stability Test of Abrasive (Slurry)>>

The stability of the abrasive (slurry) was evaluated by the presence or absence of white turbidity in the abrasive (SA) prepared in the above <Production of abrasive (SA)>. The results are shown in Table 1.

White turbidity was absent: Good

White turbidity was present: Poor

<<Polishing Test>>

The substrate for polishing (a single crystal silicon wafer having a crystal structure of 1.0.0) was set in a polishing machine (NF300, manufactured by Nano Factor Co., Ltd.), and polished for 10 minutes by use of a polishing pad SUBA600 with a load of 15 kPa applied to the substrate at a table rotation speed of 50 rpm, and a spindle speed of 60 rpm while the abrasive (SA) was fed at a rate of 250 mL/min. Thereafter, the substrate was washed with pure water and air-dried.

Then, the polished surface of the resulting polished substrate was observed, and the smoothness of the surface was evaluated by using the following criteria (degree of scratches). The results are shown in Table 1.

Almost no scratch was found: Good

A few scratches were found: Fair

Scratches were found over a wide area: Poor

For silica components remaining on the polished substrate, the degree of remaining was observed by using a laser microscope (VK-X250, manufactured by KEYENCE CORPORATION), and evaluated by using the following criteria. The results are shown in Table 1.

Almost no silica component remained: Good

A few silica components remained: Fair

Silica components remained over a wide area: Poor

Example 2

<Production of Dispersion Liquid of Silica Particle (SB) and Production of Abrasive (SB)>

Figure 4:
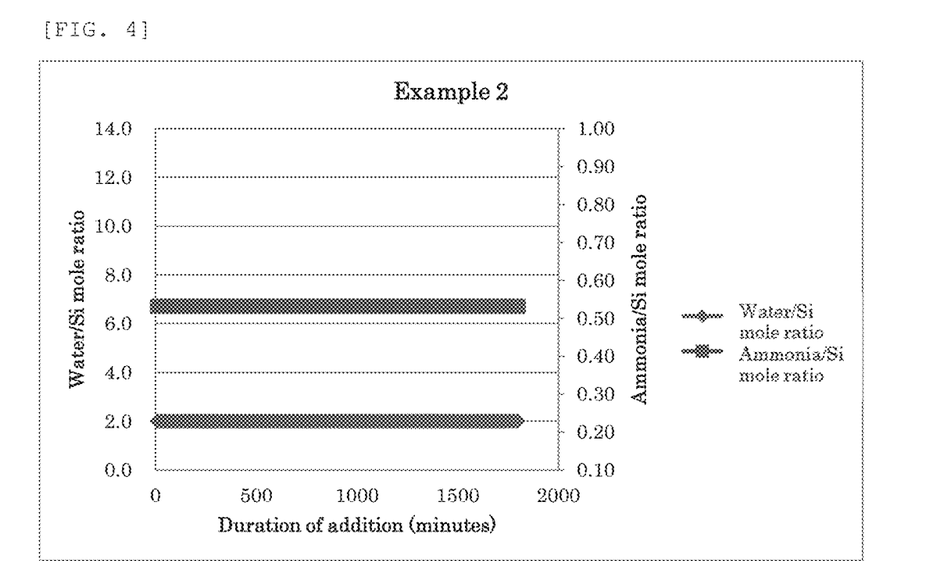
FIG. 4 is a graph showing the chronological change in the variation rate of catalyst proportion and the variation rate of water proportion in Example 2.

310.0 g of methanol (liquid I) was kept at 50° C., and 5703.8 g of a methanol solution of tetramethoxysilane (liquid A) and 1560.0 g of aqueous ammonia (liquid B) were simultaneously added to the liquid I over 30 hours. After completion of the addition, the mixture was further aged at the same temperature for 3 hours. The solvent was substituted with pure water to obtain 20% by mass of a dispersion liquid of a silica particle (SB). Detailed processing conditions and results of various measurements are shown in Table 1. The chronological changes in the variation rate of catalyst proportion and the variation rate of water proportion are shown in FIG. 4.

An abrasive (SB) was produced in the same manner as in Example 1 except that the dispersion liquid of a silica particle (SB) was used, and a stability test and a polishing test were performed in the same manner as in Example 1. The results are shown in Table 1.

Example 3

<Production of Dispersion Liquid of Silica Particle (SC) and Production of Abrasive (SC)>

Figure 5:
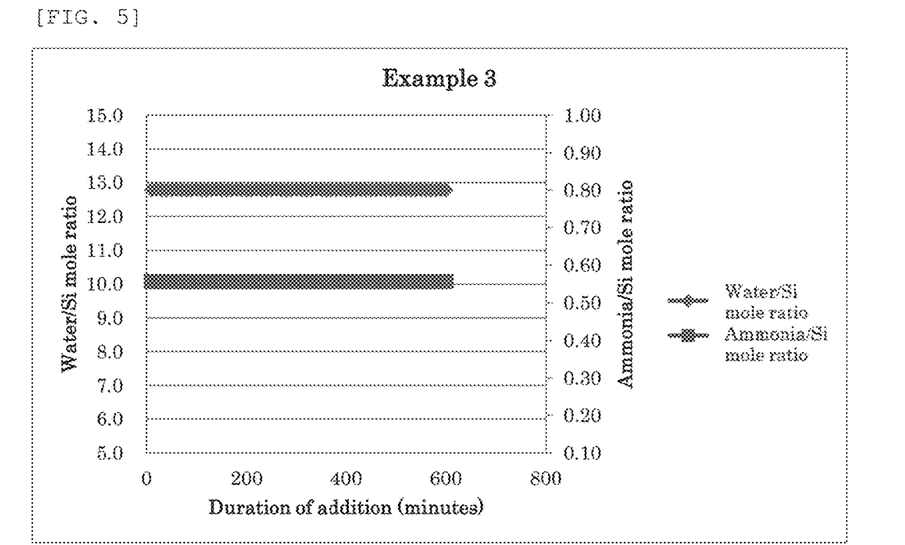
FIG. 5 is a graph showing the chronological change in the variation rate of catalyst proportion and the variation rate of water proportion in Example 3.

410.0 g of methanol (liquid I) was kept at 40° C., and 976.3 g of tetramethoxysilane (liquid A) and 1769.5 g of aqueous ammonia (liquid B) were simultaneously added to the liquid I over 10 hours. After completion of the addition, the mixture was further aged at the same temperature for 3 hours. The solvent was substituted with pure water to obtain 20% by mass of a dispersion liquid of a silica particle (SC). Detailed processing conditions and results of various measurements are shown in Table 1. The chronological changes in the variation rate of catalyst proportion and the variation rate of water proportion are shown in FIG. 5.

An abrasive (SC) was produced in the same manner as in Example 1 except that the dispersion liquid of a silica particle (SC) was used, and a stability test and a polishing test were performed in the same manner as in Example 1. The results are shown in Table 1.

Example 4

<Production of Dispersion Liquid of Silica Particle (SD) and Production of Abrasive (SD)>

Figure 6:
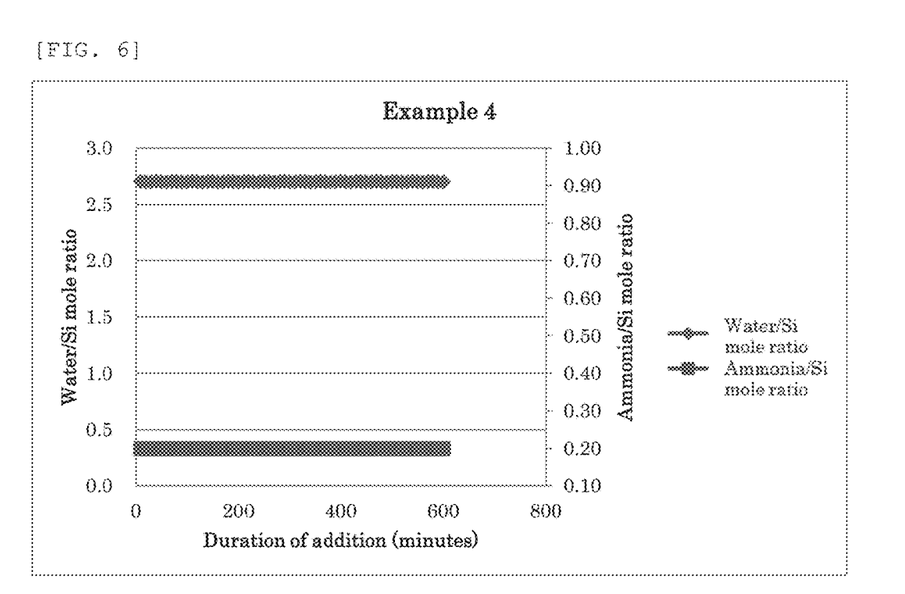
FIG. 6 is a graph showing the chronological change in the variation rate of catalyst proportion and the variation rate of water proportion in Example 4.

410.0 g of methanol (liquid I) was kept at 40° C., and 2206.3 g of a methanol solution of tetramethoxysilane (liquid A) and 565.33 g of aqueous ammonia (liquid B) were simultaneously added to the liquid I over 10 hours. After completion of the addition, the mixture was further aged at the same temperature for 3 hours. The solvent was substituted with pure water to obtain 20% by mass of a dispersion liquid of a silica particle (SD). Detailed processing conditions and results of various measurements are shown in Table 1. The chronological changes in the variation rate of catalyst proportion and the variation rate of water proportion are shown in FIG. 6.

An abrasive (SD) was produced in the same manner as in Example 1 except that the dispersion liquid of a silica particle (SD) was used, and a stability test and a polishing test were performed in the same manner as in Example 1. The results are shown in Table 1.

Example 5

<Production of Dispersion Liquid of Silica Particle (SE) and Production of Abrasive (SE)>

Figure 7:
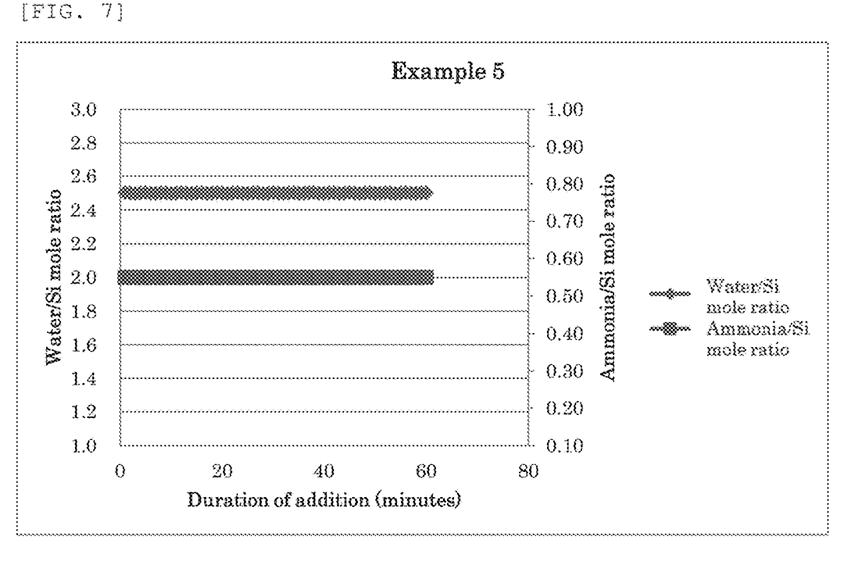
FIG. 7 is a graph showing the chronological change in the variation rate of catalyst proportion and the variation rate of water proportion in Example 5.

410.0 g of methanol (liquid I) was kept at 50° C., and 388.1 g of a methanol solution of tetramethoxysilane (liquid A) and 116.1 g of aqueous ammonia (liquid B) were simultaneously added to the liquid I over 1 hour. After completion of the addition, the mixture was further aged at the same temperature for 3 hours. The solvent was substituted with pure water to obtain 20% by mass of a dispersion liquid of a silica particle (SE). Detailed processing conditions and results of various measurements are shown in Table 1. The chronological changes in the variation rate of catalyst proportion and the variation rate of water proportion are shown in FIG. 7.

An abrasive (SE) was produced in the same manner as in Example 1 except that the dispersion liquid of a silica particle (SE) was used, and a stability test and a polishing test were performed in the same manner as in Example 1. The results are shown in Table 1.

Example 6

<Production of Dispersion Liquid of Silica Particle (SF) and Production of Abrasive (SF)>

Figure 8:
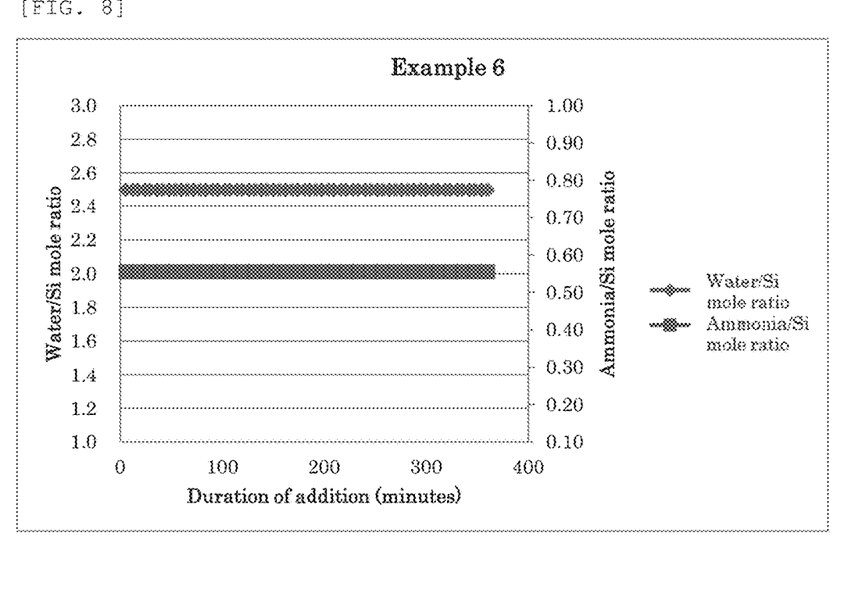
FIG. 8 is a graph showing the chronological change in the variation rate of catalyst proportion and the variation rate of water proportion in Example 6.

410.0 g of methanol (liquid I) was kept at 50° C., and 2328.6 g of a methanol solution of tetramethoxysilane (liquid A) and 696.69 g of aqueous ammonia (liquid B) were simultaneously added to the liquid I over 6 hours. After completion of the addition, the mixture was further aged at the same temperature for 3 hours. The solvent was substituted with pure water to obtain 20% by mass of a dispersion liquid of a silica particle (SF). Detailed processing conditions and results of various measurements are shown in Table 1. The chronological changes in the variation rate of catalyst proportion and the variation rate of water proportion are shown in FIG. 8.

An abrasive (SF) was produced in the same manner as in Example 1 except that the dispersion liquid of a silica particle (SF) was used, and a stability test and a polishing test were performed in the same manner as in Example 1. The results are shown in Table 1.

Comparative Example 1

<Production of Dispersion Liquid of Silica Particle (RA) and Production of Abrasive (RA)>

Figure 9:
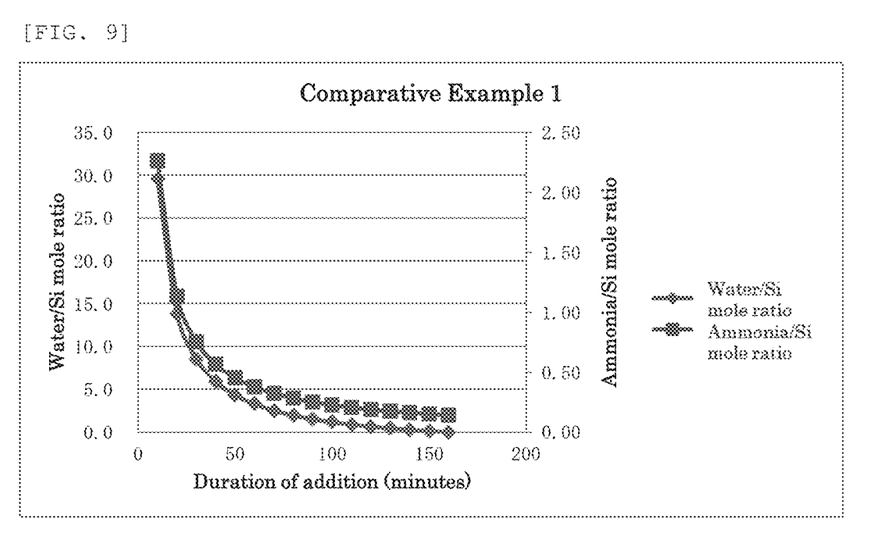
FIG. 9 is a graph showing the chronological change in the variation rate of catalyst proportion and the variation rate of water proportion in Comparative Example 1.

A liquid I consisting of 2268.0 g of methanol, 337.5 g of pure water, and 94.5 g of 29% aqueous ammonia was kept at 40° C., and 2170.0 g of a methanol solution of tetramethoxysilane (liquid A) was added to the liquid I over 160 minutes. After completion of the addition, the mixture was further aged at the same temperature for 1 hour. The solvent was substituted with pure water to obtain 20% by mass of a dispersion liquid of a silica particle (RA). Detailed processing conditions and results of various measurements are shown in Table 1. The chronological changes in the variation rate of catalyst proportion and the variation rate of water proportion are shown in FIG. 9.

An abrasive (RA) was produced in the same manner as in Example 1 except that the dispersion liquid of a silica particle (RA) was used, and a stability test and a polishing test were performed in the same manner as in Example 1. The results are shown in Table 1.

In any of the Examples and the Comparative Example, the silica particle included a content of each of U and Th of less than 0.3 ppb, a content of each of alkali metals, alkali earth metals, Fe, Ti, Zn, Pd, Ag, Mn, Co, Mo, Sn, Al, and Zr of less than 0.1 ppm, and a content of each of Cu, Ni, and Cr of less than 1 ppb.

«Measurement of Contents of Metal Elements»

The silica particle was dissolved in hydrofluoric acid, and heated to remove the hydrofluoric acid, and then added with pure water as necessary, and the resulting solution was subjected to measurement with an inductively coupled plasma (ICP) emission mass spectrometer (e.g., ICPM-8500, manufactured by Shimadzu Corporation) to determine the contents of metal elements in the silica particle.

TABLE 1

| | | Example 1 | Example 2 | Example 3 | Example 4 | Example 5 | Example 6 | Comparative Example 1 |
|---|---|---|---|---|---|---|---|---|
| Liquid I | Methanol | 410 g | 310 g | 410 g | 410 g | 410 g | 410 g | 2268.0 g |
| | Pure water | — | — | — | — | — | — | 337.5 g |
| | 29% Aqueous ammonia | — | — | — | — | — | — | 94.5 g |
| Liquid A | Tetramethoxysilane | 976.3 g | 2928.8 g | 976.3 g | 976.3 g | 195.3 g | 1171.5 g | 1733.2 |
| | Methanol | 2460.0 g | 2775.0 g | — | 1230.0 g | 192.8 g | 1157.1 g | 436.8 |

TABLE 1-continued

|  |  | Example 1 | Example 2 | Example 3 | Example 4 | Example 5 | Example 6 | Comparative Example 1 |
|---|---|---|---|---|---|---|---|---|
| Liquid B | Pure water | 1459.0 g | 960.0 g | 1560.0 g | 490.3 g | 74.7 g | 446.3 g | — |
|  | 29% Aqueous ammonia | 225.0 g | 600.0 g | 209.5 g | 75.0 g | 41.4 g | 250.4 g | — |
| Initial mole ratio of alkali catalyst/silane alkoxide | | 0.60 | 0.53 | 0.56 | 0.20 | 0.55 | 0.55 | 2.26 |
| Initial mole ratio of water/silane alkoxide | | 110 | 2,0 | 12.8 | 2.7 | 2.5 | 2.5 | 29.5 |
| Alkali catalyst/silane alkoxide (variation rate to initial value) | | 1.00 | 1.00 | 1.00 | 1.00 | 1.00 | 1.00 | 0.06-1.00 |
| Water/silane alkoxide (variation rate to initial value) | | 1.00 | 1.00 | 1.00 | 1.00 | 1.00 | 1.00 | 0.00-1.00 |
| Hydrolysis temperature (° C.) | | 40 | 50 | 40 | 40 | 50 | 50 | 40 |
| Hydrolysis time (minutes) | | 600 | 1800 | 600 | 600 | 60 | 360 | 160 |
| Aging temperature (° C.) | | 40 | 50 | 40 | 40 | 50 | 50 | 40 |
| Aging time (hours) | | 3 | 3 | 3 | 3 | 3 | 3 | 1 |
| pH at end of reaction | | 11.5 | 11.3 | 11.5 | 11.1 | 11.5 | 11.6 | 10.3 |
| Shape of particle (aspect ratio) | | inegular shape (1.40) | irregular shape (1.30) | irregular shape (1.40) | irregular shape (1.25) | irregular shape (1.10) | irregular shape (1.30) | irregular shape (1.30) |
| Average particle diameter (nm) | | 50 | 75 | 55 | 60 | 5 | 30 | 32 |
| Amount (ppm) of incompletely reacted materials | | 150 | 180 | 160 | 160 | 150 | 140 | 350 |
| Slurry stability | | Good | Good | Good | Good | Good | Good | Poor |
| Polishing property (scratches) | | Good | Good | Good | Good | Good | Good | Poor |
| Polishing property (silica components remaining) | | Good | Good | Good | Good | Good | Good | Poor |

As shown in Table 1, the dispersion liquid of a silica particle produced in each of Examples 1 to 6 had less incompletely reacted materials than that produced in Comparative Example 1 and also had excellent slurry stability and polishing property.

What is claimed is:

1. A method for producing a dispersion liquid of a silica particle, comprising:
   providing a liquid I consisting substantially of an organic solvent in a container; and
   simultaneously adding a liquid A containing silane alkoxide and a liquid B containing an alkali catalyst and water to the liquid I to cause hydrolysis and polycondensation of the silane alkoxide so as to produce a silica particle;
   wherein a content of the organic solvent in liquid I is 99% by mass or more.

2. The method for producing a dispersion liquid of a silica particle according to claim 1, wherein
   a variation rate of a mole ratio of the alkali catalyst to silane alkoxide in a reaction system during a period from a start to an end of an addition of the liquids A and B relative to an initial mole ratio of the alkali catalyst to silane alkoxide is 0.90 to 1.10; and
   the variation rate of the mole ratio of water to silane alkoxide in the reaction system during the period from the start to the end of the addition of the liquids A and B relative to the initial mole ratio of water to silane alkoxide is 0.90 to 1.10.

3. The method for producing a dispersion liquid of a silica particle according to claim 1, wherein
   the mole ratio of the alkali catalyst to silane alkoxide in the reaction system during a period from the start to the end of the addition of the liquids A and B is constantly 0.20 or more; and the mole ratio of water to silane alkoxide in the reaction system during the period from the start to the end of the addition of the liquids A and B is constantly 2.0 or more.

4. The method for producing a dispersion liquid of a silica particle according to claim 1, wherein a pH in the reaction system at the end of the addition of the liquids A and B is 11 or higher.

* * * * *